United States Patent
Salmimaa et al.

(10) Patent No.: US 7,032,188 B2
(45) Date of Patent: Apr. 18, 2006

(54) MULTILEVEL SORTING AND DISPLAYING OF CONTEXTUAL OBJECTS

(75) Inventors: Marja Salmimaa, Tampere (FI); Juha Lehikoinen, Lakiala (FI); Hannu Korhonen, Tampere (FI); Eero Räsänen, Tampere (FI)

(73) Assignee: Nokia Corporation, Espoo (FI)

( * ) Notice: Subject to any disclaimer, the term of this patent is extended or adjusted under 35 U.S.C. 154(b) by 403 days.

(21) Appl. No.: 09/966,042

(22) Filed: Sep. 28, 2001

(65) Prior Publication Data

US 2003/0063128 A1    Apr. 3, 2003

(51) Int. Cl.
*G06K 15/00* (2006.01)

(52) U.S. Cl. ...................... 715/864; 715/805
(58) Field of Classification Search ................ 345/864, 345/846, 862, 859, 856, 853–854, 840, 821, 345/825, 805, 767, 802; 715/846, 847, 849–855, 715/862, 803–805, 712, 711, 864, 771–773, 715/821–824, 802, 800, 748–749; 455/566, 455/456.3, 557

See application file for complete search history.

(56) References Cited

U.S. PATENT DOCUMENTS

| | | | |
|---|---|---|---|
| 5,812,131 A | | 9/1998 | Bertram |
| 5,920,826 A | | 7/1999 | Metso et al. |
| 5,943,399 A | * | 8/1999 | Bannister et al. ........ 379/88.17 |
| 5,950,130 A | * | 9/1999 | Coursey .................. 455/432.1 |
| 6,020,881 A | * | 2/2000 | Naughton et al. .......... 345/740 |
| 6,032,053 A | | 2/2000 | Schroeder et al. |
| 6,047,197 A | | 4/2000 | Jarrad |
| 6,141,003 A | * | 10/2000 | Chor et al. ................. 715/719 |
| 6,356,905 B1 | | 3/2002 | Gershman et al. |
| 6,362,841 B1 | * | 3/2002 | Nykanen ................... 345/835 |
| 6,384,850 B1 | * | 5/2002 | McNally et al. ............ 345/810 |
| 6,400,958 B1 | | 6/2002 | Isomursu et al. |
| 6,434,500 B1 | * | 8/2002 | Boehne et al. ............. 702/120 |
| 6,456,841 B1 | | 9/2002 | Tomimori |
| 6,466,236 B1 | * | 10/2002 | Pivowar et al. ............ 345/835 |
| 6,490,465 B1 | | 12/2002 | Mittelstadt et al. |
| 6,668,177 B1 | * | 12/2003 | Salmimaa et al. .......... 455/566 |
| 6,871,323 B1 | * | 3/2005 | Wagner et al. ............. 715/716 |

FOREIGN PATENT DOCUMENTS

| | | |
|---|---|---|
| WO | WO99/21164 | 4/1999 |
| WO | WO99/49453 | 9/1999 |
| WO | WO 00/65429 | 11/2000 |

OTHER PUBLICATIONS

International Search Report.

* cited by examiner

*Primary Examiner*—Steven Sax
(74) *Attorney, Agent, or Firm*—Banner & Witcoff, Ltd.

(57) ABSTRACT

An apparatus and method for displaying a plurality of icons on the display of a mobile terminal are provided. Icons are displayed in at least two different sections. The first section includes icons having sizes determined by comparing characteristics of associated messages to one or more context values, such as time of day, geographic area, or user profile characteristics. The second section includes icons having sizes determined by the proximities of the message sources to the mobile terminal.

39 Claims, 7 Drawing Sheets

MULTILEVEL SORTING AND DISPLAYING OF CONTEXTUAL OBJECTS

FIELD OF THE INVENTION

The invention relates to the display of objects on display screens of portable electronic devices. More particularly, the invention provides methods and devices for sorting and displaying icons in such a way that certain icons are more prominently featured than other icons.

BACKGROUND OF THE INVENTION

Graphical user interface screens that include icons have been widely used with modem computer systems to represent application programs and documents on computer displays. The well-known MAC OS operating system from Apple Computer Corporation and the WINDOWS operating system from Microsoft Corporation are two examples of widely used operating systems that utilize graphical user interfaces.

More recently, mobile terminals such as cellular telephones and wireless-enabled PDAs have incorporated graphics-oriented technology that allows a user to select application programs, web sites, and documents. Following increases in computing performance and memory capacity, mobile terminals now host an increasing number of application programs and capabilities. The Nokia 9210 COMMUNICATOR, for example, supports numerous functions such as telephone, fax, e-mail, calendar, and contacts features.

In order to maintain a convenient handheld form factor, the graphics displays for mobile terminals are necessarily small, thus limiting the amount of information that can be comfortably viewed at one time. Consequently, one problem confronting designers of such devices is determining how to maximize the number of icons and other graphical symbols on the display of such devices without making the symbols too small to see.

U.S. Pat. No. 6,047,197, entitled "Icon Driven Phone Menu System," describes a cellular telephone including a display mode selector that allows a user to select one of two display modes. In a first display mode, icons representing applications are arranged in rows and columns, thus allowing a user to navigate in two dimensions using cursor buttons. In a second display mode, the icons are displayed on one side of the cellular telephone display with a text field adjacent to each icon that identifies the icon.

Although the display modes in the aforementioned patent allow a user to navigate through numerous icons on the display, each icon takes up roughly the same amount of space on the display, regardless of its importance to the particular user. For example, if one user predominantly uses application programs A and B, whereas a second user predominantly uses application programs C and D, each user must navigate through the same set of icons in order to locate his or her desired application programs.

As location-based information and location-based services become a reality, mobile terminal users will receive even more messages and associated icons. The messages may include location-specific messages (e.g., advertisements for restaurants and movie theaters). The problems associated with displaying icons on small screens with conventional methods and devices will only increase as the number of received messages increases and users will have to spend more time sorting through icons to find icons corresponding to the application programs and messages they desire to execute or view.

Therefore, there exists a need in the art for systems and methods that allow users to display a large number of icons on a small screen in a manner that emphasizes the icons most likely to be of interest to the users.

SUMMARY OF THE INVENTION

The above-mentioned needs in the art are satisfied by the disclosed systems and methods that display certain icons in a manner more prominently than other icons. Embodiments wherein certain icons are represented in a smaller form factor allow a large number of icons to be represented in a given display area while allowing the user to quickly identify icons that are likely to be used at any given time. Icons can be represented in a proximity bar, a priority bar or both on the same display.

A first embodiment of the invention provides a method of displaying a plurality of icons that can be selected by a user from a display on a mobile terminal. The method includes receiving a plurality of messages from message sources and comparing one or more characteristics associated with each of the plurality of messages to one or more context values that are specific to the user of the mobile terminal. Next, a proximity associated with each message source in relation to the mobile terminal is determined. An icon is associated with each of the plurality of messages. A first icon corresponding to a message having one or more characteristics that best match the one or more context values is represented in a priority section of the display using a display format that is enlarged in relation to the other icons in the priority section. And, a second icon corresponding to a message source having the closest proximity is represented in a proximity section of the display using a display format that is enlarged in relation to the other icons in the proximity section.

In another embodiment, another method of displaying a plurality of icons that can be selected by a user from a display on a mobile terminal is provided. The method includes receiving a plurality of messages from a message source and receiving a first profile containing context values that are specific to the user of the mobile terminal. One or more characteristics associated with each of the plurality of messages are compared to one or more of the first profile context values. A proximity associated with each message source in relation to the mobile terminal is determined and an icon is assigned to each of the plurality of messages. Next, a first icon corresponding to a message having one or more characteristics that best match the one or more context values of the first profile is represented in a priority section of the display using a display format that is enlarged in relation to the other icons in the priority section. A second icon corresponding to a message source having the closest proximity using a display format that is enlarged in relation to the remaining plurality of icons is represented in a proximity section of the display.

In yet another embodiment of the invention, a mobile terminal is provided. The mobile terminal includes a display capable of displaying graphical icons and a user input device that permits a user of the mobile terminal to select one or more of the graphical icons displayed on the display. The mobile terminal also includes a processor programmed with computer-executable instructions that, when executed, perform the steps of: (a) comparing one or more characteristics associated with each of a plurality of messages received from message sources to one or more context values that are specific to the user of the mobile terminal; (b) determining a proximity associated with each message source in relation to the mobile terminal; (c) associating an icon with each of the plurality of messages; (d) representing, in a priority section of the display, a first icon corresponding to a message having one or more characteristics that best match the one or more context values using a display format that is enlarged in relation to the other icons in the priority section; and (e) representing, in a proximity section of the display, a second icon corresponding to a message source having the closest proximity using a display format that is enlarged in relation to the other icons in the proximity section.

In one or more of the above embodiments, the user may control the criteria that determine how each icon is displayed, such that different mobile terminal users may potentially have differently prioritized icons. In some variations, selection of an icon causes a hyperlink (Universal Resource Locator) to be activated, thus launching a web application.

In other embodiments of the invention, computer-executable instructions for implementing the disclosed methods are stored on computer-readable media.

BRIEF DESCRIPTION OF THE DRAWINGS

The present invention is illustrated by way of example and not limited in the accompanying figures in which like reference numerals indicate similar elements and in which.

DETAILED DESCRIPTION OF THE INVENTION

Figure 1:
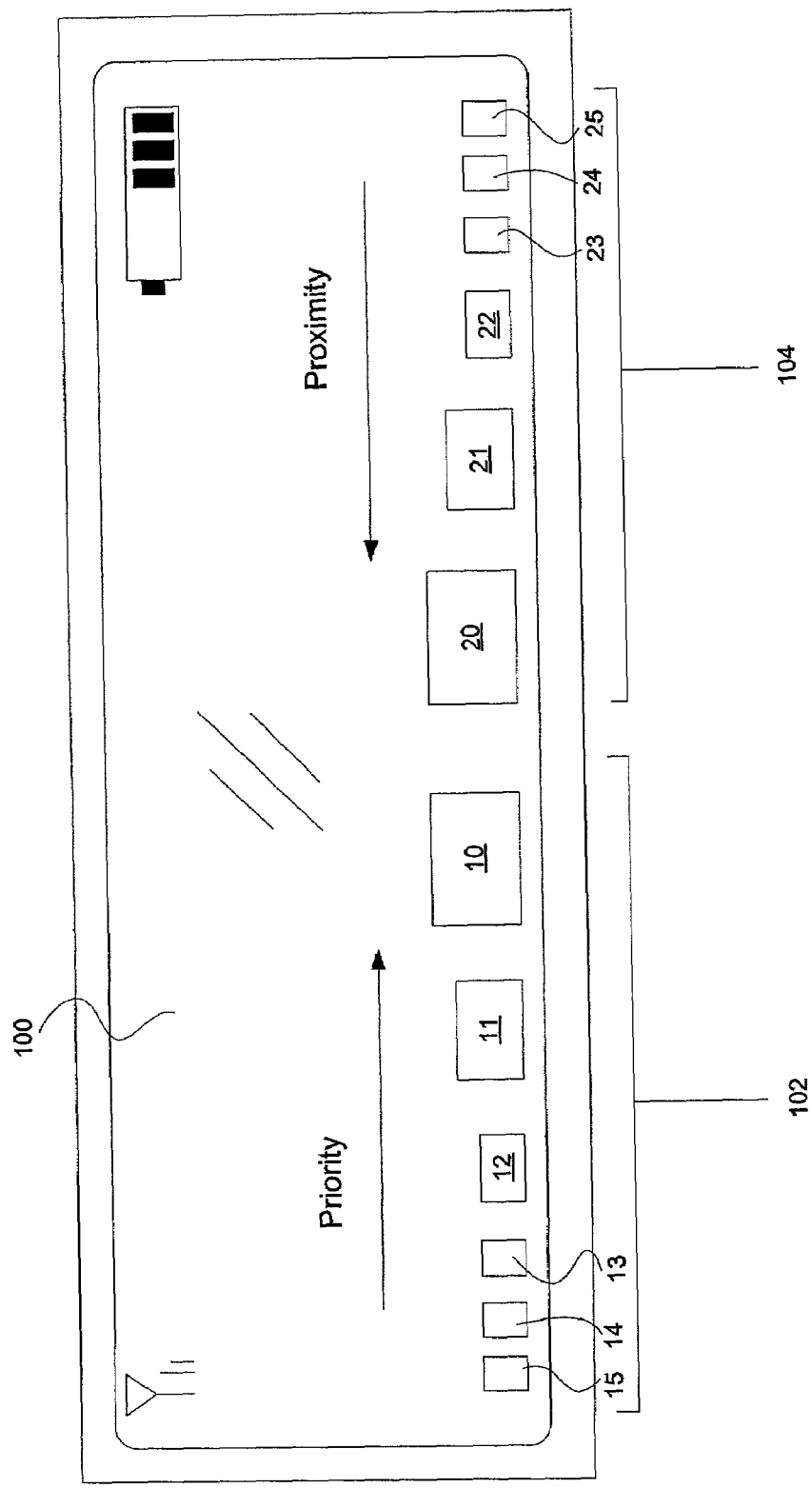
FIG. 1 shows a display having two context bars each with icons having variable sizes in accordance with an embodiment of the invention.

FIG. 1 shows a mobile terminal display 100 having icons 10–15 and 20–25 arranged in accordance with an embodiment of the invention. The mobile terminal may comprise a Nokia 9210 COMMUNICATOR, a cellular telephone, portable computer, or any other mobile electronic device having a display. In the embodiment shown in FIG. 1, icons 10–15 form a priority navigation bar 102 and icons 20–25 form a proximity navigation bar 104. Navigation bar 102 includes icons having different dimensions, wherein the dimensions generally correspond to the degree to which messages associated with each icon match one or more context values. Navigation bar 104 includes icons having different dimensions, wherein the dimensions generally correspond to the proximity of the message source. Other visually discernible differences in icon display characteristics can be used to signify differences in matched values and proximity, such as different widths; different heights; colors; intensities; shapes; or the like. The size of the icons may also be based on a stratified matching approach, such that icons falling within a certain match range are assigned a first size, and icons falling within the next match range are assigned a second size that is smaller than the first size.

As a mobile terminal moves around a geographic area, the terminal may receive messages from retail stores, restaurants, movie theaters, public transportation terminals, Web sites, and other entities. The messages can be provided to the mobile terminal based on the terminal's location within a predetermined geographic area (for example, the area served by a particular cell phone tower), or based on other factors (e.g., the identity of the mobile user, time of day, other demographic factors, or the precise geographic location of the mobile terminal.).

The proximities of the sources of the received messages may be used to position and size the icons forming proximity navigation bar 104. Proximity can be derived by the mobile terminal based on a comparison of the terminal's specific location with the location of the source of the message, or it could be provided directly by the entity if the entity is able to discern the location of the mobile terminal. The location of the mobile terminal may be determined by a variety of conventional methods and devices such as identifying a cell phone tower or using a global positioning system.

The messages can also be ranked in a priority order determined by one or more context values. Corresponding icons can then be displayed as part of priority navigation bar 102 using a display format that indicates the degree of matching between characteristics associated with the message and one or more of the context values. In certain embodiments, context values may be identical for a group of mobile terminal users. In other embodiments, users can individually specify, prioritize and modify context values. Users can also create different profiles having different context values and switch between the profiles. It is also of course possible to provide default context values that can be changed by a user.

Figure 2:
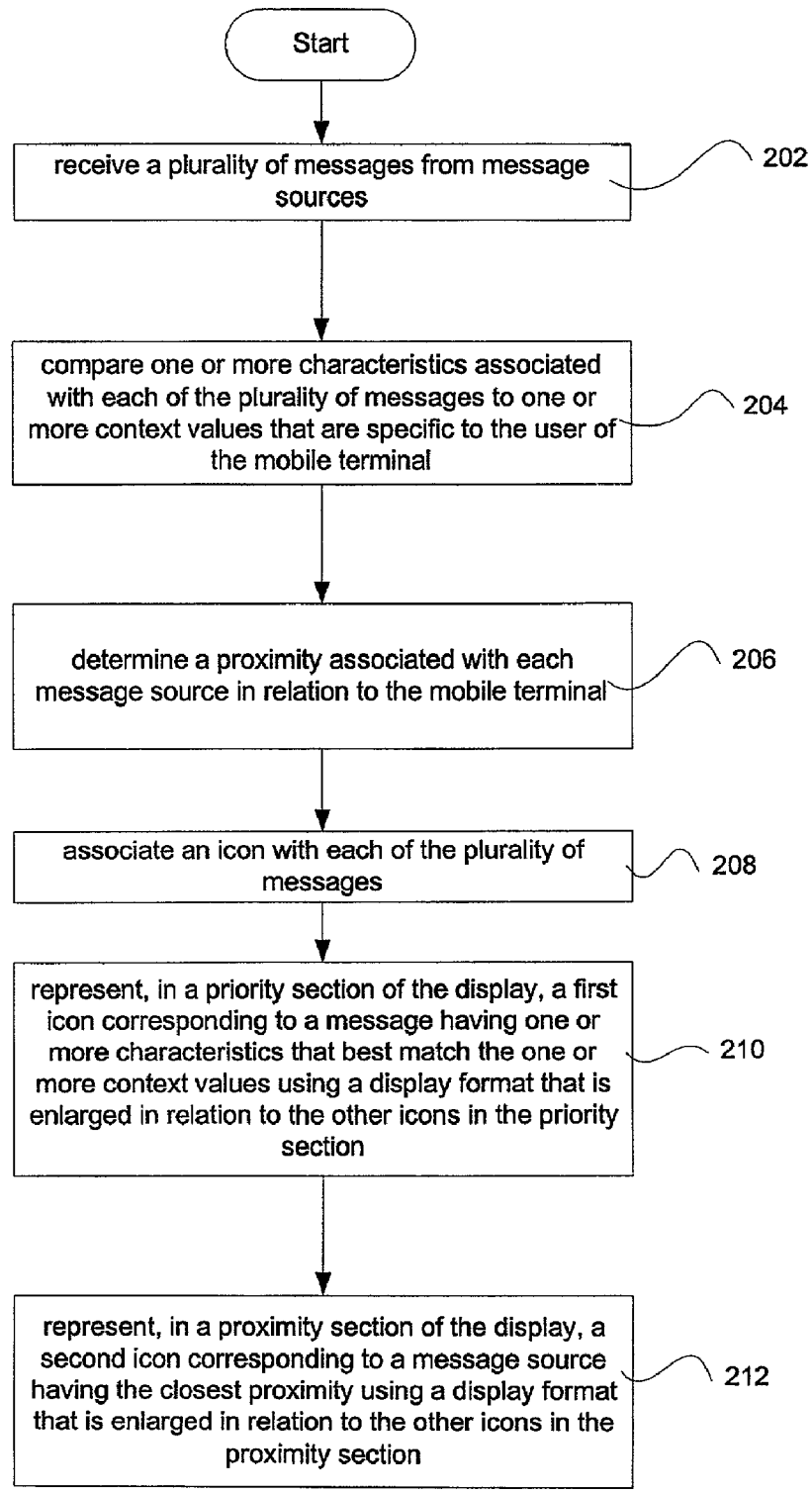
FIG. 2 shows a method of representing icons in accordance with an embodiment of the invention.

FIG. 2 illustrates a method that may be used to arrange icons on display 100. First, in step 202, the mobile terminal receives a plurality of messages from message sources. In an illustrative example, the user is in a geographic area that includes several sources of food and desires to find a preferred restaurant. The message sources may include restaurants and other sources of food. Of course, other entities may also transmit messages to the mobile terminal. In one embodiment, the user can limit the display to displaying food sources by selecting an appropriate profile option, as described in detail below.

In step 204, one or more characteristics associated with each of the plurality of messages are compared to one or more context values that are specific to the user of the mobile terminal. Context values can include an endless number of factors that a user may find relevant. In the food example, context values can include grade of service (e.g., four-star restaurants), price, friends (i.e., preference for indicating presence of other mobile units corresponding to known persons) and availability.

Next, in step 206, a proximity associated with each message source in relation to the mobile terminal may be determined or calculated. One skilled in the art will appreciate that the physical source of the message may not correspond with the actual location of the entity offering the advertised goods or services. For example, a message may be transmitted from a radio tower placed several blocks away from a restaurant associated with the message. Accordingly, step 206 may include calculating or determining the proximity of the actual entity offering the goods and services in relation to the mobile terminal.

Icons are associated with each of the plurality of messages in step 208. Icons may be transmitted as part of the message or may be stored locally in a memory of the mobile terminal. In one embodiment, messages are transmitted in a markup language such as the extensible markup language (XML) to conveniently separate characteristics and icons.

In step 210, a first icon corresponding to a message having one or more characteristics that best match the one or more context values may be represented in a priority section of the display using a display format that is enlarged in relation to the other icons in the priority section. For example, when grade of service is determined to be the primary context value, icon 10 may correspond to a restaurant having the highest grade of service. Icons 11 through 15 correspond to restaurants have a lower grade of service and are, therefore, represented with the icons having smaller dimensions than that of icon 10.

Finally, in step 212, a second icon corresponding to a message source having the closest proximity may be represented in a proximity section of the display using a display format that is enlarged in relation to the other icons in the proximity section. In the embodiment shown in FIG. 1, icon 20 may correspond to a restaurant having the closest proximity to th mobile station. Icons 21 through 25 are located farther away from the mobile station and are, therefore, represented with icons having smaller dimensions than that of icon 20.

Display 100 allows the user of the mobile terminal to quickly look at the display to determined which restaurants are closer than others and which restaurants most closely meet predefined criteria. For example, icons 20 and 15 may correspond to a first restaurant and icons 10 and 21 may correspond to a second restaurant. The user will be able to quickly determine that the first restaurant is the closest to the user but that restaurant ranks low according to the predefined criteria. Moreover, the user will also be able to quickly determine that the second restaurant ranks very high according to the predefined criteria and is also relatively close to the user.

In one embodiment of the invention, icons 10 to 15 and 20 through 25 are symbols that represent the message sources, such as corporate logos or trademarks. Of course, one or may of the icons may comprise a graphic symbol corresponding to an application program, a hyperlink to a Web page, an informational message, a document, a prepopulated e-mail inquiry, or any of various other types of objects. The user of the mobile terminal can select any object using a conventional keypad, cursor button, stylus, or the like. It will be appreciated that other types of icons and icon selection mechanisms can be used without departing from the principles of the invention.

Figure 3:
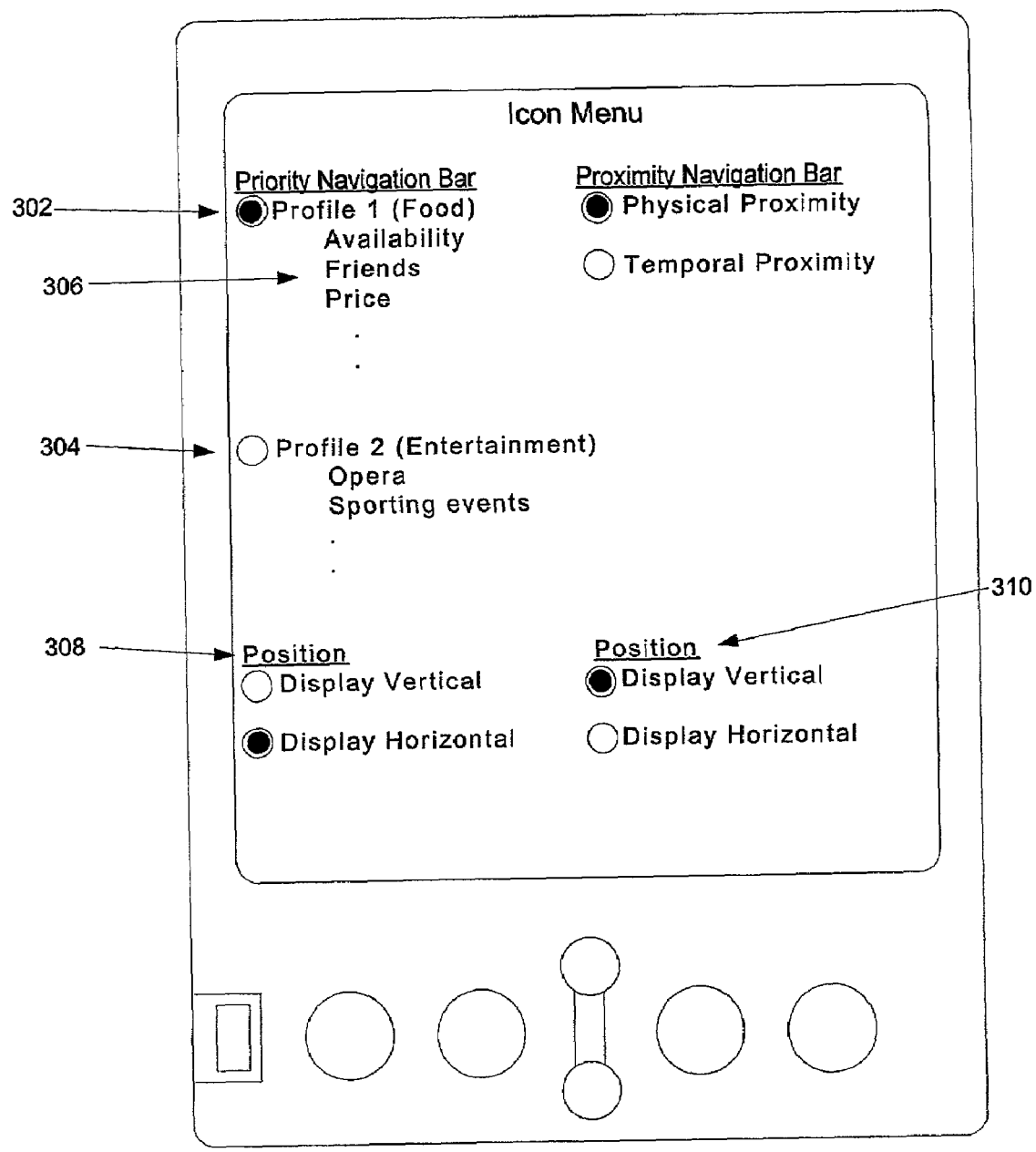
FIG. 3 shows a graphical user interface that allows a user to customize the display of icons in accordance with an embodiment of the invention.

FIG. 3 illustrates a graphical user interface that can be used to configure the selection, size and placement of icons forming priority and proximity navigation bars. With respect to the priority navigation bar, the user may select between two profiles 302 and 304. Profile 302 is a food profile created by the user and includes the context values 306 of availability, friends and price. The order of placement of the context values under the profile heading may correspond to the importance of those context values (e.g., the most important value is listed first.). If two entities have a similar context value, the next context value may determine the order of the corresponding icons. The user may create or be provided with numerous profiles to choose from. Alternatively, each user may have a single profile with which to list context values under.

The graphical user interface shown in FIG. 3 may also be used to configure the proximity navigation bar. In particular, the user may select between physical proximity and temporal proximity. The present invention does not require the use of a proximity navigation bar. In an alternative embodiment, the proximity navigation bar may be replaced with a second priority navigation bar and the user may select a profile that is different from the profile that corresponds to the first priority navigation bar.

Figure 4:
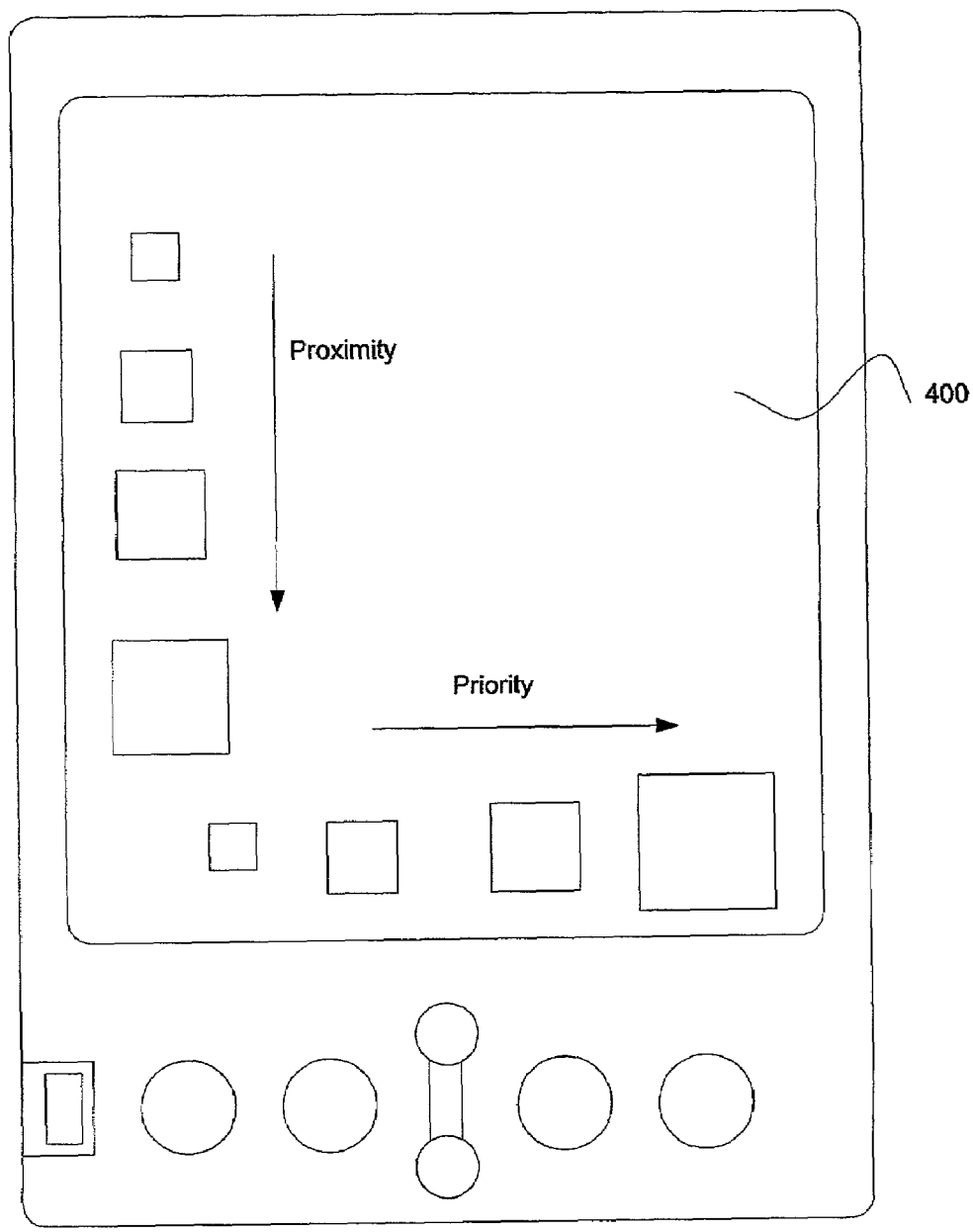
FIG. 4 shows a display screen having icons arranged in a row and a column in accordance with an embodiment of the invention.
Figure 5:
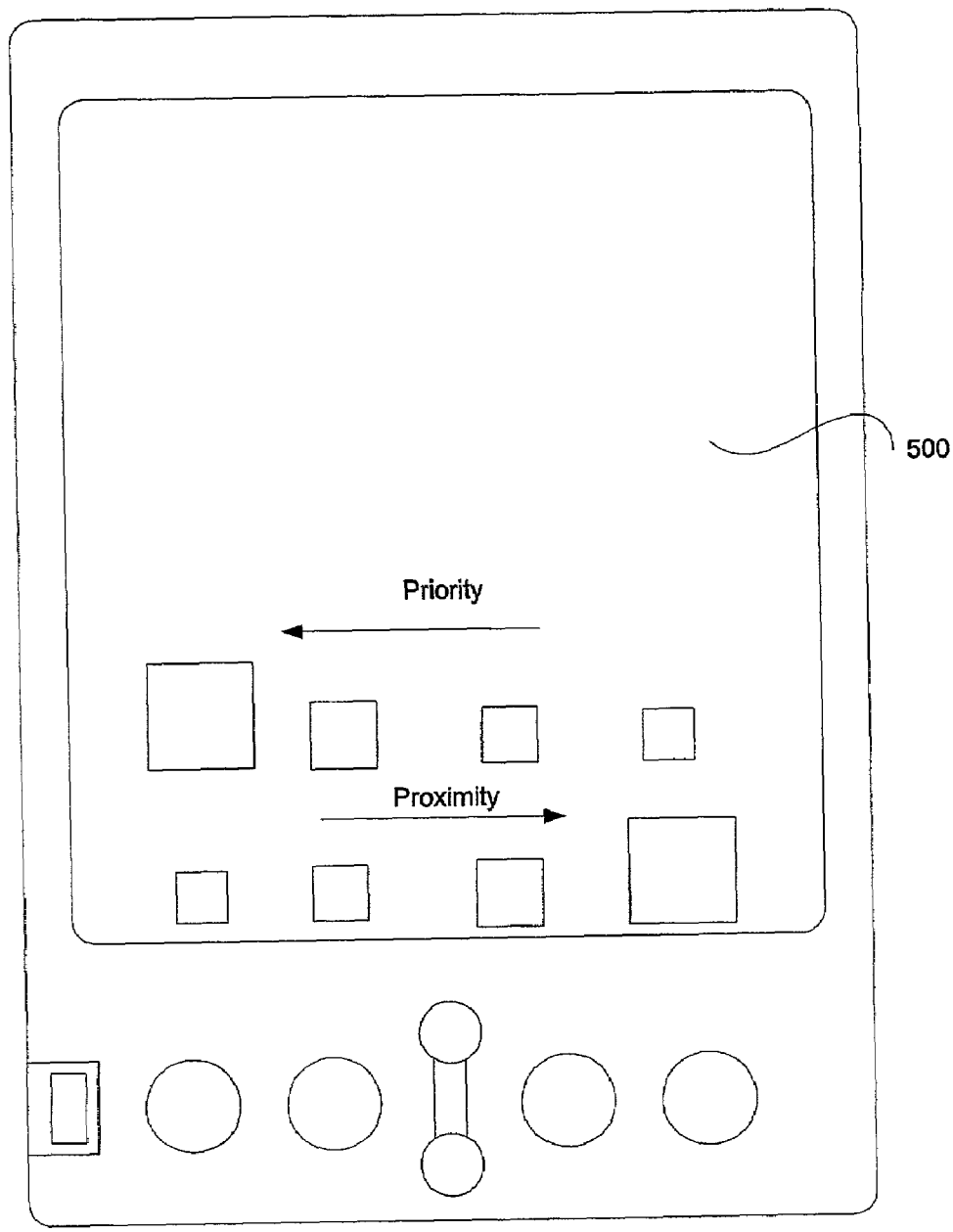
FIG. 5 shows a display screen having icons arranged in rows in accordance with an embodiment of the invention.

The position of the priority navigation bar and proximity navigation bar may be chosen by selecting position variables 308 and 310. Display 100 (shown in FIG. 1) has the priority and proximity navigation bars 102 and 104 both placed along a horizontal axis. FIG. 4 shows an embodiment in which a display 400 includes a proximity navigation bar formed along a vertical axis and a priority navigation bar formed along a horizontal axis. Of course, there are numerous different ways to display icons to provide information to the user. FIG. 5 shows a display 500 in which the priority and proximity navigation bars are formed horizontally in different rows. In an alternative embodiment, the priority and proximity navigation bars may be formed vertically in different columns. The icons can also arranged in a diagonal, vertical, horizontal, or other type of arrangement. Icons can also be presented in a circular, spiral, or other two-dimensional pattern radiating outward from a center point, such that icons in the center area are larger (or more prominent) than icons that radiate outwardly from the center.

Figure 6:
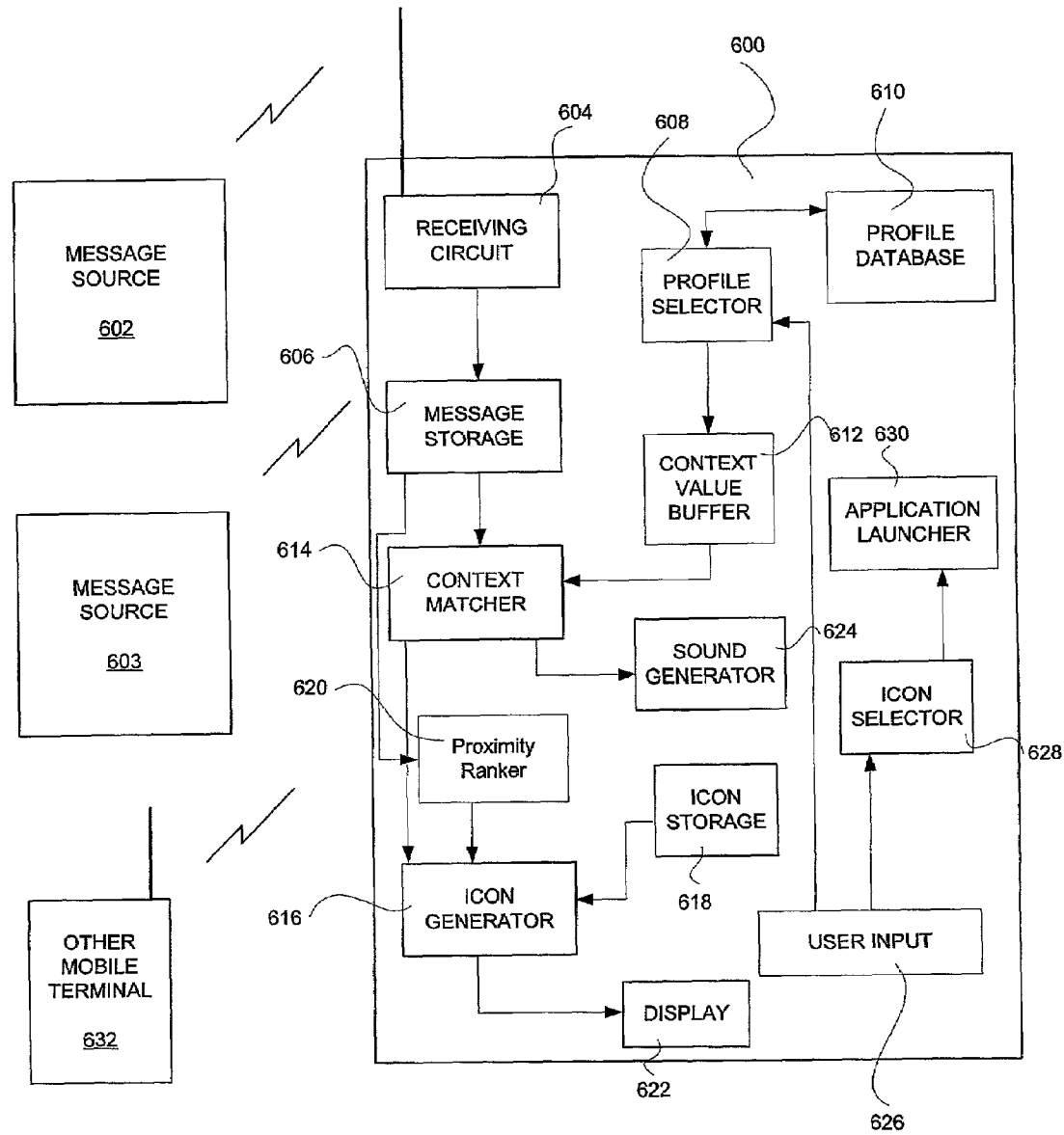
FIG. 6 shows a mobile terminal configured in accordance with various principles of the invention.

FIG. 6 shows a mobile terminal 600 configured in accordance with various principles of the invention. Although not explicitly shown in FIG. 6, the mobile terminal may include a microprocessor or other computing device and memory for storing computer-executable instructions to carry out the principles of the invention. As shown in FIG. 6, mobile terminal 600 communicates with a message source 602 and a message source 603 through a receiving circuit 604. In one embodiment, message sources 602 and 603 communicate with mobile terminal 600 in a wireless manner (e.g., radio frequency, optical, or other communication means). Message sources 602 and 603 may include such entities as: restaurants, travel agencies, hotels, Web sites or any other entities able to communicate with mobile terminal 600. Two message sources are shown for illustrative purposes only with the understanding that several additional message sources may transmit messages to mobile terminal 600.

Messages that are transmitted by message sources 602 and 603 may include information such as the geographic location of an establishment; proximity of the establishment to a particular mobile user or other geographic location; price information; corporate logos; pictographic icons; hyperlinks to Web pages; advertisements (including audio, video, or text); entertainment services (e.g., music, videos, and the like); indicators identifying grades of service (e.g., AAA ratings, hotel "star" ratings, restaurant rankings, and the like); availability of services (e.g., indicating whether a hotel has vacancies; that a particular restaurant is crowded; or the average waiting time for service at a particular restaurant); personal e-mails from friends or family, or any other type of characteristics that can be matched to context values.

Messages are received by receiving circuit 604 and stored in a message storage area 606. Messages may be time-stamped and expire or be deleted after a certain period of time. In embodiments that allow for the use of more than one profile, a profile selector 608 may be used to retrieve context values corresponding to a selected profile from a profile database 610. The retrieved context values may then be transmitted to a context value buffer 612. Context values are matched with one or more characteristics of the message in a context matcher function 614. Context matcher function 614 produces a ranked ordering of messages based on the one or more context values and uses the ranked ordering to drive an icon generator 616. Icon generator 616 retrieves one or more icons from icon storage area 618 (if not included in a message) and, based on the ranking information, generates a display that includes a priority navigation bar in the manner described above.

A proximity ranker 620 may be used to produce an ordered list of messages, with the order determined by the proximities of the message sources. Proximity ranker 620 may also drive icon generator 616. In some cases, icon generator 616 will retrieve an icon from icon storage area 618 and produce two different scaled versions of the single icon. One scaled icon may be used for the priority navigation bar and the other scaled icon may be used for the proximity navigation bar.

The icons forming the priority and proximity navigation bars are transmitted to a display 622. Context matcher 614 and proximity ranker 620 may also be configured to identify messages that have predetermined characteristics. For example, the context matcher may be programmed to particularly identify any message received from a certain hardware store. An icon associated with the message may be placed in a predetermined location of display 622 to identify the significance of the message. Context matcher 614 and proximity ranker 620 may also transmit a signal to a sound generator 624 to alert the user of a message having one or more predetermined characteristics. For example, the user may be shopping for shoes and wish to receive an audible tone when the mobile terminal receives a message advertising a shoe sale.

A user input device 626 can be used to modify the selection of profiles and context values stored profile database 610. User input device 626 may be implemented with a keypad, cursor, stylus, or similar input device. An optional icon selector function 628, for example a magnifying glass selector, allows the user to move over icons on the display to depict further information regarding the icons and to temporarily enlarge icons of potential interest. Other icon selectors can of course be used without departing from the inventive principles. Application launcher 630 launches an application associated with the selected icon in response to further user input. For example, application launcher 630 may start a Web browsing application if the particular icon has an associated hyperlink. Alternatively, if an icon represents a document, application launcher 630 can launch a document viewer or editor program.

Of course, other mobile terminals 632 may also transmit messages to mobile terminal 600. In one embodiment, the user of mobile terminal 600 may assign context values so that messages received from other known users (e.g., friends or family members) receive prioritized treatment in displaying associated icons.

Figure 7:
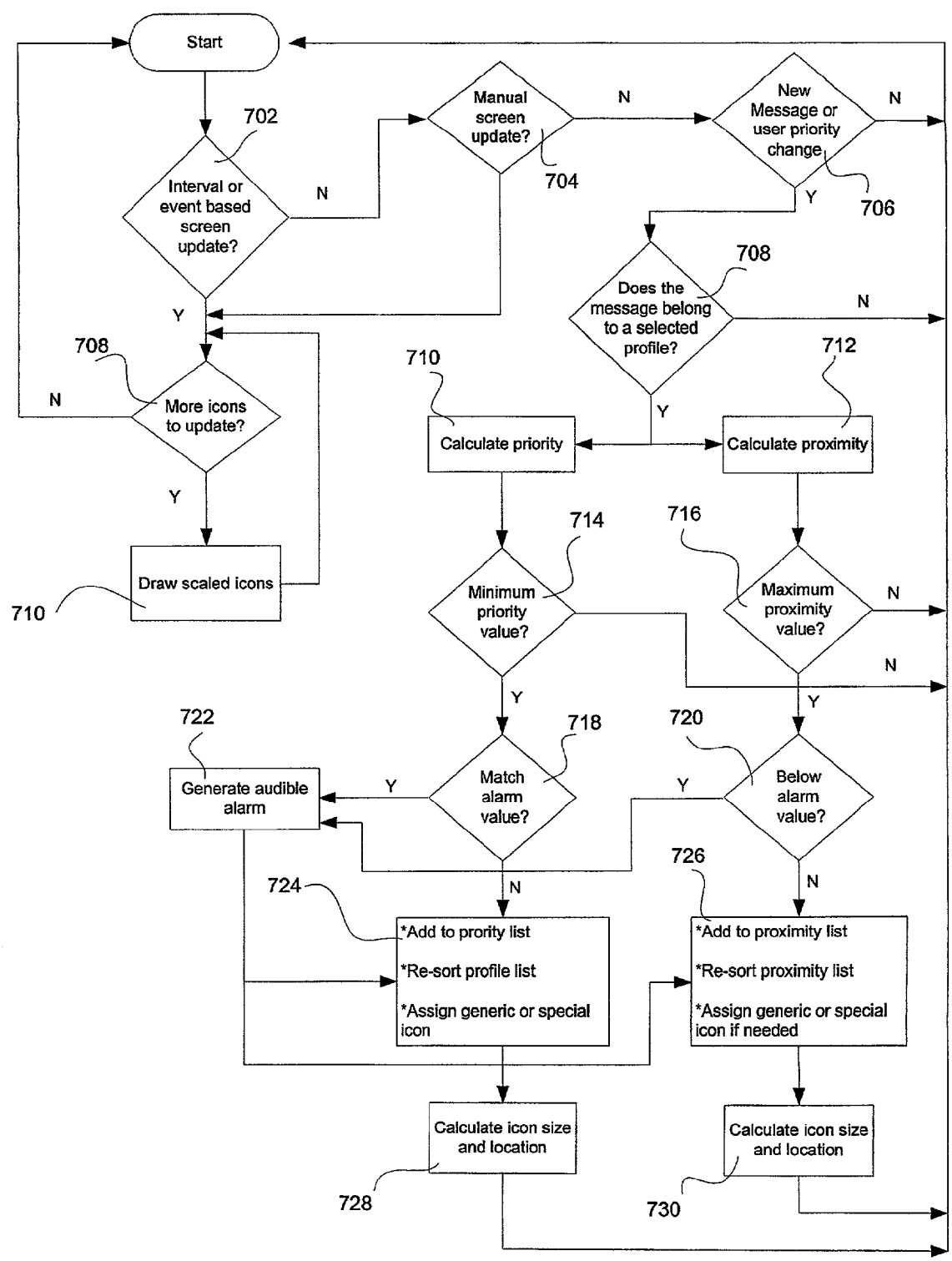
FIG. 7 shows a flowchart illustrating steps that can be performed to practice one or more methods according to the invention.

FIG. 7 shows a flowchart illustrating steps that can be performed to practice one or more methods according to the invention. In step 702, a check is made to determine whether an interval has expired or an event-based screen update is required. An interval may be selected to cause the display to be updated after every interval. The movement of the mobile terminal to a new location is an example of an event that may require a screen update. If an interval has not expired and an event-based screen update is not required, then in step 704 a check is made to determine whether the user has manually updated the screen (e.g., moved objects on the display). If not, then in step 706, a check is made to determine whether a new message has been received or whether the user has changed a profile a context value. If not, processing returns to step 702.

If in step 702 an interval has expired or an event-based screen update is required, then in steps 708 and 710 a loop is executed to update the icons on the display, wherein each icon is scaled and displayed. When there are no more icons to update, processing returns to step 702. If in step 704 a manual screen update occurred, then steps 708 and 710 are performed as outlined above.

If in step 706 a new message was received or the user changed a priority setting, then in step 708, a check is made to determine whether the new message corresponds to a selected profile. For example, if the user has selected a food profile, messages relating to laundry machines will not correspond to the profile, the message may be deleted or ignored and processing will return to step 702. If the message does correspond to the selected profile, the priority or ranking of the new message is calculated (if a new message was received) based on a context value and/or the user's profile in step 710. Step 710 may also include steps of extracting information from the message and storing it into message storage area 606 (e.g., price information and the like). When the user changes a priority setting (e.g., changed the importance of proximity to be lower than the importance of price), new priorities for previously stored messages in message storage area 606 may be re-calculated.

The messages are also ranked with respect to proximity in step 712. In step 714, if the message does not have a minimum priority value, processing returns to step 702. Likewise, in step 716, if the message exceeds a maximum proximity value, processing returns to step 702. In one embodiment, the minimum priority and maximum proximity values are context values provided by the user. In another embodiment, the minimum priority and the maximum proximity values may be relative. For example, a minimum priority value may be selected so that only fifteen icons are displayed on the priority navigation bar.

Next, a check is made to determine whether the message contains data that matches an alarm value in step 718. A check is also made to determine whether the proximity of the message source is less than an alarm value in step 720. In one embodiment of the invention, the alarm values are context values set by the user. If the message contains data that matches an alarm value or the proximity of the message source is less than an alarm value, in step 722 and audible alarm is generated. In an alternative embodiment, the mobile terminal may be configured to vibrate instead of generating an audible alarm.

In step 724, the characteristics of the message are added to a priority list; the list is resorted by comparing characteristics of each message to appropriate context values; and each message is assigned to either a generic icon (if no entity-supplied icon is available, for instance a generic hotel icon) or a special icon (e.g., a corporate logo icon received from a hotel establishment). In step 728, the size and location of each priority icon is calculated, such that the priority icons can be displayed in the allocated priority navigation bar space. Various techniques for sizing the icons are possible; in one example, icon widths can be scaled by an amount proportional to their rankings in a table of sorted icons.

In step 726, the proximity of the message source with respect to mobile terminal is added to a proximity list and the proximity list is re-sorted. The message may also be assigned a special or generic icon (if no entity-supplied icon is available) if one has not been assigned in step 724. In step 730, the size and location of each proximity icon is calculated, such that the proximity icons can be displayed in the allocated proximity navigation bar display space.

Many different approaches for establishing priority values are possible. In one embodiment of the invention, messages are ranked first according to a primary context value (e.g., the context value listed first in FIG. 3). If two or more messages have the same characteristic that corresponds to the primary context value, the order is determined by comparing message characteristics to the next context value (e.g., the context value listed second in FIG. 3).

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims. For example, one or more of the disclosed methods may be implemented as computer-executable instructions recorded on a computer readable medium such as a floppy disk or CD-ROM.

We claim:

1. A method of displaying a plurality of icons that can be selected by a user from a display on a mobile terminal, the method comprising the steps of:
   (a) receiving a plurality of messages from message sources;
   (b) comparing one or more characteristics associated with each of the plurality of messages to one or more context values that are specific to the user of the mobile terminal;
   (c) determining a proximity associated with each message source in relation to the mobile terminal;
   (d) associating an icon with each of the plurality of messages;
   (e) representing, in a priority section of the display, a first icon corresponding to a message having one or more characteristics that best match the one or more context values using a display format that is enlarged in relation to other icons in the priority section; and
   (f) representing, in a proximity section of the display, a second icon corresponding to a message source having the closest proximity using a display format that is enlarged in relation to other icons in the proximity section, wherein the proximity section is separately located from the priority section on the display.

2. The method of claim 1, wherein step (c) comprises calculating a physical proximity to the mobile terminal.

3. The method of claim 1, wherein step (c) comprises calculating a temporal proximity.

4. The method of claim 1, wherein step (b) comprises the step of comparing characteristics and context values that relate to a time of day.

5. The method of claim 4, wherein step (b) comprises the step of comparing a service associated with one or more of the messages during the time of day, such that certain services will be preferred over other services during the particular time of day.

6. The method of claim 1, wherein step (b) comprises the step of comparing a price associated with a service corresponding to one or more of the plurality of messages.

7. The method of claim 1,
   wherein step (b) comprises the step of comparing services of a user-specified type, and
   wherein step (e) comprises the step of displaying icons corresponding to the user-specified type of services in the enlarged format.

8. The method of claim 1,
   wherein step (b) comprises the step of comparing a user-specified grade of services, and
   wherein step (e) comprises the step of displaying icons corresponding to the user-specified grade of services in the enlarged format.

9. The method of claim 1, wherein step (d) comprises extracting an icon from one of the plurality of messages.

10. The method of claim 1, wherein in step (b) at least some of the characteristics are extracted from the message.

11. The method of claim 1, wherein in step (b) at least one of the one or more context values are set by the user of the mobile terminal.

12. The method of claim 1, further comprising the step of, in response to the user selecting one of the icons, launching an application program associated with the selected icon.

13. The method of claim 12, wherein the application program comprises a program that displays text included in the message corresponding to the icon.

14. The method of claim 1, wherein the priority section comprises a navigation bar formed along a portion of a bottom of the display.

15. The method of claim 14, wherein the proximity section comprises a navigation bar formed along a portion of the bottom of the display.

16. The method of claim 1, wherein one of the priority section and the proximity section comprises a navigation bar formed along at least a portion of a bottom of the display.

17. The method of claim 16, wherein the other one of the priority section and the proximity section comprises a navigation bar formed along at least a portion of a side of the display.

18. The method of claim 1, wherein the priority section and proximity section comprise separate rows formed along a portion of a bottom of the display.

19. The method of claim 1, wherein the priority section and proximity section comprise separate columns formed along a portion of a side of the display.

20. The method of claim 1, further including:
   (g) updating the arrangement of icons displayed on the display.

21. The method of claim 20, wherein (g) is performed in response movement of the mobile terminal.

22. The method of claim 20, wherein (g) is performed periodically at the expiration of a time interval.

23. The method of claim 1, further including receiving minimum priority and maximum proximity values from the user.

24. The method of claim 1, further including determining relative minimum priority and maximum proximity values so that a predetermined number of icons will be displayed.

25. The method of claim 1, wherein (c) comprises determining whether one or more characteristics satisfies an alarm value.

26. The method of claim 25, further including activating an alarm when the one or more characteristics satisfies the alarm value.

27. The method of claim 1, wherein (d) comprises determining whether a proximity is less than an alarm value.

28. The method of claim 27, further including activating an alarm when the proximity is less than the alarm value.

29. A method of displaying a plurality of icons that can be selected by a user from a display on a mobile terminal, the method comprising the steps of:
   (a) receiving a plurality of messages from message sources;
   (b) receiving a first profile containing context values that are specific to the user of the mobile terminal;
   (c) comparing one or more characteristics associated with each of the plurality of messages to one or more of the first profile context values;
   (d) determining a proximity associated with each message source in relation to the mobile terminal;
   (e) associating an icon with each of the plurality of messages;
   (f) representing, in a priority section of the display, a first icon corresponding to a message having one or more characteristics that best match the one or more context values of the first profile using a display format that is enlarged in relation to other icons in the priority section; and
   (g) representing, in a proximity section of the display, a second icon corresponding to a message source having the closest proximity using a display format that is enlarged in relation to other icons in the proximity section, wherein the proximity section is separately located from the priority section on the display.

30. The method of claim 29, further comprising the step of receiving a second profile containing context values that are specific to the user of the mobile terminal, and wherein step (c) comprises comparing one or more characteristics associated with each of the plurality of messages to one or more of the first profile context values and to one or more of the second profile context values to determine classifications for each of the messages.

31. The method of claim 30, wherein the first profile is created by the user of the mobile terminal.

32. The method of claim 29, further including the step of:
   deleting a received message when one or more characteristics of the message do not match the context values.

33. The method of claim 29, further comprising the steps of:
   (h) receiving a second profile containing context values that are specific to the user of the mobile terminal; and
   (i) receiving a selection of the first or second profiles from the user of the mobile terminal.

34. The method of claim 29, further including determining whether a message received in (a) corresponds to the first profile.

35. A mobile terminal comprising:
   a display capable of displaying graphical icons;
   a user input device that permits a user of the mobile terminal to select one or more of the graphical icons displayed on the display; and
   a processor programmed with computer-executable instructions that, when executed, perform the steps comprising:
      (a) comparing one or more characteristics associated with each of a plurality of messages received from message sources to one or more context values that are specific to the user of the mobile terminal;
      (b) determining a proximity associated with each message source in relation to the mobile terminal;
      (c) associating an icon with each of the plurality of messages;
      (d) representing, in a priority section of the display, a first icon corresponding to a message having one or more characteristics that best match the one or more context values using a display format that is enlarged in relation to other icons in the priority section; and
      (e) representing, in a proximity section of the display, a second icon corresponding to a message source having the closest proximity using a display format that is enlarged in relation to the other icons in the proximity section, wherein the proximity section is separately located from the priority section on the display.

36. A mobile terminal comprising:
   a receiving circuit that receives a plurality of messages containing information relating to a particular service that is potentially available to a user of the mobile terminal;
   a message storage area that stores the plurality of messages;
   a display unit capable of displaying graphical icons;
   a context matching function that:
      compares information extracted from each of the plurality of messages to one or more context values;
      priority ranks the plurality of messages according to the degree to which the extracted information matches the one or more context values;
      causes a first set of graphical icons corresponding to the messages to displayed on the display unit with at least one dimension that is determined by the priority ranking; and
   a proximity ranker that:
      proximity ranks the plurality of messages according to the respective proximities of the message sources; and
      causes a second set of graphical icons corresponding to the messages to displayed on the display unit with at least one dimension that is determined by the proximity ranking, wherein the first set of graphical icons is displayed in a different region on the display unit than the second set of graphical icons.

37. The mobile terminal of claim 36, further comprising a user input device configured to permit the user to change the one or more context values.

38. A computer-readable medium containing computer-executable instructions for causing a mobile terminal to performing the steps of:
   (a) receiving a plurality of messages from message sources;
   (b) comparing one or more characteristics associated with each of the plurality of messages to one or more context values that are specific to the user of the mobile terminal;
   (c) determining a proximity associated with each message source in relation to the mobile terminal;
   (d) associating an icon with each of the plurality of messages;
   (e) representing, in a priority section of the display, a first icon corresponding to a message having one or more characteristics that best match the one or more context values using a display format that is enlarged in relation to other icons in the priority section; and
   (f) representing, in a proximity section of the display, a second icon corresponding to a message source having the closest proximity using a display format that is enlarged in relation to other icons in the proximity section, wherein the proximity section is separately located from the priority section on the display.

39. A method of displaying a plurality of icons that can be selected by a user from a display on a mobile terminal, the method comprising the steps of:

(a) receiving a plurality of messages from message sources;

(b) receiving a first profile containing context values that are specific to the user of the mobile terminal;

(c) receiving a second profile containing context values that are specific to the user of the mobile terminal;

(d) comparing one or more characteristics associated with each of the plurality of messages to one or more of the first profile context values and the second profile context values;

(e) associating an icon with each of the plurality of messages;

(f) representing, in a first priority section of the display, a first icon corresponding to a message having one or more characteristics that best match the one or more context values of the first profile using a display format that is enlarged in relation to other icons in the first priority section; and (g) representing, in a second priority section of the display, a second icon corresponding to a message having one or more characteristics that best match the one or more context values of the second profile using a display format that is enlarged in relation to other icons in the second priority section, wherein the second priority section is separately located from the first priority section on the display.

* * * * *